United States Patent
Susitaival et al.

(10) Patent No.: US 9,107,116 B2
(45) Date of Patent: Aug. 11, 2015

(54) METHOD AND APPARATUS FOR IN-DEVICE COEXISTENCE (IDC) INDICATION

(71) Applicant: TELEFONAKTIEBOLAGET L M ERICSSON (PUBL), Stockholm (SE)

(72) Inventors: Riikka Susitaival, Helsinki (FI); Håkan Persson, Solna (SE); Magnus Stattin, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/996,765

(22) PCT Filed: Apr. 26, 2013

(86) PCT No.: PCT/SE2013/050469
§ 371 (c)(1),
(2) Date: Jun. 21, 2013

(87) PCT Pub. No.: WO2014/051488
PCT Pub. Date: Apr. 3, 2014

(65) Prior Publication Data
US 2014/0094175 A1    Apr. 3, 2014

Related U.S. Application Data

(60) Provisional application No. 61/707,206, filed on Sep. 28, 2012.

(51) Int. Cl.
*H04W 36/00* (2009.01)
(52) U.S. Cl.
CPC ................. *H04W 36/0055* (2013.01)

(58) Field of Classification Search
CPC ............ H04W 88/06; H04W 72/1215; H04W 36/0083; H04W 36/0022; H04W 36/0061; H04W 36/04
See application file for complete search history.

(56) References Cited

U.S. PATENT DOCUMENTS

| | | | |
|---|---|---|---|
| 8,780,880 B2 * | 7/2014 | Lin et al. | 370/345 |
| 2012/0069766 A1 | 3/2012 | Fu et al. | |
| 2012/0207040 A1 * | 8/2012 | Comsa et al. | 370/252 |
| 2012/0214489 A1 * | 8/2012 | Koo et al. | 455/436 |
| 2012/0252442 A1 * | 10/2012 | Fu et al. | 455/426.1 |
| 2013/0303214 A1 * | 11/2013 | Ahmadi | 455/501 |

FOREIGN PATENT DOCUMENTS

| | | |
|---|---|---|
| WO | WO 2011/123550 | 10/2011 |
| WO | WO 2012/021879 | 2/2012 |

OTHER PUBLICATIONS

International Search Report mailed Aug. 13, 2013 in International Application No. PCT/SE2013/050469.

(Continued)

*Primary Examiner* — Liton Miah
(74) *Attorney, Agent, or Firm* — Baker Botts, LLP (57) ABSTRACT

This disclosure relates to methods and apparatuses for In-Device Coexistence (IDC) indication. Among other things, the present disclosure presents a method performed by a user equipment (UE). The UE is configured to send 201 an IDC indication message with a same content as in a previously sent IDC indication message if, or when, the UE has performed a handover to another cell (target cell).

16 Claims, 4 Drawing Sheets

(56) References Cited

OTHER PUBLICATIONS

Written Opinion of the International Search Authority mailed Aug. 13, 2013 in International Application No. PCT/SE2013/050469.
"PPI and IDC Indication Upon Handover", 3GPP TSG-RAN WG2 Meeting #81; R2-130863; Jan. 28-Feb. 1, 2013, 6 pages.
Notification of Transmittal of the International Preliminary Report on Patentability; PCT/SE2013/050469, Int'l Filing Date Apr. 26, 2013 (12 pgs).
3GPP TSG-RAN WG2 Meeting #79. R2-124311, Qingdao, China, Aug. 13-17, 2012 (6 pgs).

* cited by examiner

METHOD AND APPARATUS FOR IN-DEVICE COEXISTENCE (IDC) INDICATION

This application is the U.S. national phase of International Application No. PCT/SE2013/050469, filed 26 Apr. 2013, which designated the U.S. and claims the benefit from U.S. Provisional Application No. 61/707,206, filed 28 Sep. 2012, the entire contents of each of which are hereby incorporated by reference.

TECHNICAL FIELD

The technology described in this disclosure relates to cellular radio communications and finds one non-limiting example to an Evolved Universal Terrestrial Radio Access Network (E-UTRAN). More particularly, the present disclosure presents methods and apparatuses for In-Device Coexistence (IDC) indication.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Figure 1:
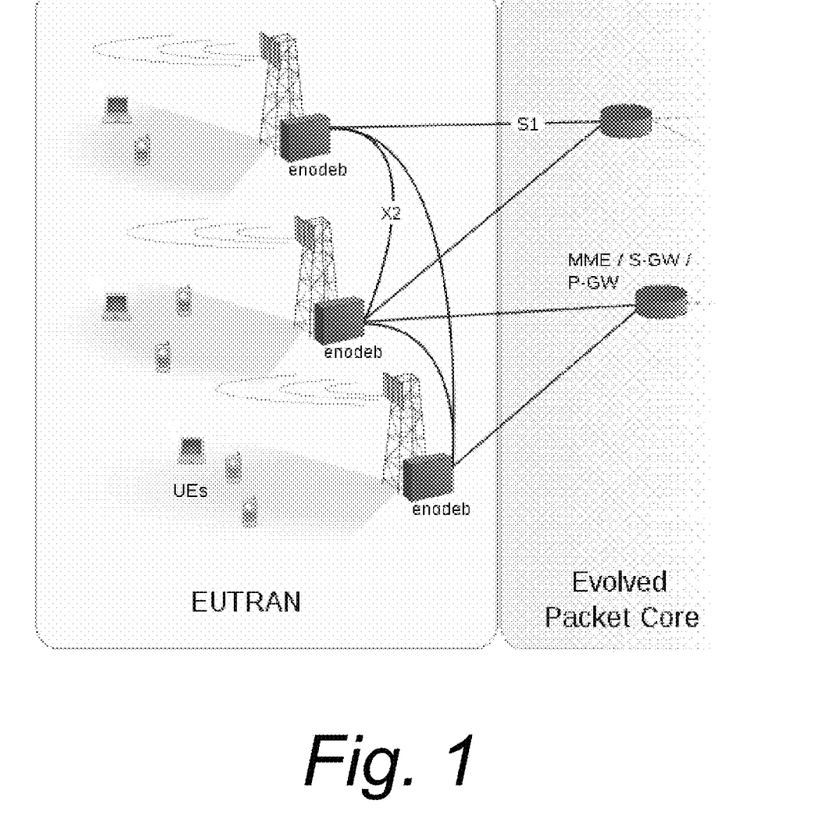
FIG. 1 shows an illustration of an example EUTRAN.

FIG. 1 is an illustration of an example EUTRAN which is the air interface of the $3^{rd}$ Generation Partnership Project's (3GPP) Long Term Evolution (LTE) of mobile communication networks. As is known among persons skilled in the art, the LTE radio access network uses a flat architecture with a single type of node, i.e. the evolved NodeB (eNB). The eNB is generally responsible for radio-related functions in one or several radio cells. As can be seen in FIG. 1, the eNB's are connected to the Evolved Packet Core (EPC) by means of the S1 interface. More particularly, the eNB's can be connected to a Serving Gateway (S-GW) by means of a S1 user-plane part, S1-u. Also, the eNB's can be connected to a Management Mobility Entity (MME) by means of a S1 control-plane part, S1-c. Furthermore, a Packet Data Network Gateway (PDN Gateway, P-GW) may connect the EPC to the Internet. Moreover, the X2 interface is the interface that connects the eNB's to each other. A more detailed description of the radio-interface architecture can be found in literature, such as in the reference book 4G *LTE/LTE-Advanced for Mobile Broadband* by Erik Dahlman, Stefan Parkvall and Johan Sköld, *Academic Press*, 2011, *ISBN:*978-0-12-385489-6, see e.g. chapter 8 "Radio-Interface Architecture".

More mobile devices, smartphones, etc. are and will be equipped with multiple radio transceivers in order to access various networks. For example, a User Equipment (UE) may be equipped with LTE, WiFi, and Bluetooth transceivers, and Global Navigation Satellites Systems (GNSS) receivers. When the radio transceivers within the same UE, which are close to each other, operate on adjacent frequencies or sub-harmonic frequencies, transmissions associated with one radio transmitter may interfere with the receiver of another radio. This interference situation is referred to as an In-Device Coexistence (IDC) interference scenario, or IDC interference situation.

One approach to address this IDC interference problem, or IDC interference situation, is to minimize IDC interference between co-located radio transceivers by filtering. However, this may be technically challenging and expensive such that alternative solutions are needed. Another approach is to essentially move the interfering signal or signals either in frequency domain or in the time domain so that interference is reduced between the radios.

Currently, the 3GPP is standardizing signaling mechanisms for in-device coexistence (IDC) interference avoidance. The current status of the solution is described in a Change Request (CR) R2-124311 for the 3GPP Technical Specification TS 36.300. The R2-124311 was presented at a 3GPP meeting in Qingdao, China, Aug. 13-17, 2012. The contents of R2-124311 can be found in Appendix A (see also, ftp://ftp.3gpp.org/tsg_ran/WG2_RL2/TSGR2_79/Docs/R2-124311.zip)

In support of the IDC interference avoidance is the signaling between a UE and the network, e.g., a base station such as an eNB. A UE that supports IDC functionality indicates this capability to the network, and the network can then configure by dedicated signaling whether the UE is allowed to send an IDC indication. The UE may only send an IDC indication for E-UTRA uplink/downlink (UL/DL) carriers for which a Measurement Object (MO) is configured. When a UE experiences a level of IDC interference that cannot be solved by the UE itself and a network intervention is required, the UE sends an "IDC indication" via dedicated RRC (Radio Resource Control) signaling to report the IDC interference problem. The IDC indication is preferably triggered based on actual ongoing IDC interference on the serving and/or non-serving frequencies rather than on assumptions or predictions of potential interference. When notified of an IDC problem via IDC indication signaling from the UE, the eNB may apply, for example, a Frequency Division Multiplexing (FDM) solution or a Time Division Multiplexing (TDM) solution.

An example of an FDM solution is moving an LTE signal further away from the industrial, scientific and medical (ISM) band by performing inter-frequency handover within E-UTRAN to WCDMA or other similar technologies. An example of a TDM solution is to ensure that transmission of a radio signal does not coincide with reception of another radio signal during the same time slot or period. The LTE Discontinuous Reception (DRX) mechanism may be used to provide TDM patterns (i.e., periods during which the UE's LTE transceiver may be scheduled or not scheduled) to resolve IDC issues. A DRX-based TDM solution is preferably used in a predictable way, e.g., the eNB ensures a predictable pattern of unscheduled periods using a DRX type mechanism.

To assist the eNB in selecting an appropriate solution, IDC assistance information for both FDM and TDM solutions may be sent by the UE together with the IDC indication to the eNB. The IDC assistance information comprises, for example, a list of E-UTRA carriers suffering from ongoing interference, the direction of the interference, TDM patterns or parameters to enable appropriate DRX configuration for TDM solutions on the serving E-UTRA carrier, and/or an indication if interference is over. In case of an inter-eNB handover, the IDC assistance information is preferably transferred from the source eNB to the target eNB.

A prohibit mechanism, such as an IDC indication prohibit timer, may be used to restrict the time interval at which the UE sends an IDC indication in order to avoid unnecessary IDC indication signaling. For example, a prohibit timer can prohibit the UE from sending another IDC indication message soon after it previously sent an earlier IDC indication message. When the UE sends an IDC indication, the UE may start an IDC indication prohibit timer. The UE is generally not allowed to send a new IDC indication as long as prohibit timer is running Alternatively, an IDC indication prohibit timer may be applicable to all new IDC indication messages. In this alternative, the UE may be further restricted to not send the same IDC indication content to the network as the UE sent earlier—irrespective of the status of the prohibit timer. Another alternative applies an IDC indication prohibit timer only to an IDC indication message whose content has changed from the previously sent IDC indication message.

A problem with these approaches is that an IDC indication cannot be sent by the UE even if it is actually needed, e.g. needed by the network. Although an IDC indication prohibit timer could be configured to a small value timeout to ameliorate this situation, a too short an IDC indication prohibit timer value can lead to a heavy signaling load consuming valuable radio resources as well as an increased computational load in network nodes.

SUMMARY

It is in view of the above considerations and others that the various embodiments of the present invention have been made.

In one non-limiting example embodiment, a UE sends an IDC indication message irrespective of an IDC indication prohibit timer when time-based parameters, e.g., time division multiplex (TDM) parameters, change in the IDC indication message. In another non-limiting example embodiment, a UE is not permitted to send an IDC indication message where the same content in the IDC indication has not changed from the previously sent IDC indication message—irrespective of the UE's IDC indication prohibit timer. In yet another example embodiment, the UE is allowed to resend the same IDC indication after a handover—irrespective of the UE's IDC indication prohibit timer—to ensure that the target eNB receives the correct IDC information.

More particularly and according to a first aspect, there is provided a method performed by a user equipment (UE). The method comprises sending an In-Device Coexistence (IDC) indication message with a same content as in a previously sent IDC indication message if the UE has performed a handover to another cell (which may hereinafter also be referred to as "target cell"). In other words, the method may comprise sending an IDC indication message which is the same as the previously sent IDC indication message if, or when, the UE has performed a handover to another radio cell. As will be appreciated, the above-mentioned previously sent IDC indication message was sent by the same UE.

In one embodiment, the method may comprise sending, in a target cell, the IDC indication message with the same content as in the previously sent IDC indication message if the UE has sent the IDC indication message to a source evolved NodeB (eNB) later than a previous measurement report has been sent. In other words, the method may comprise sending, in a target cell, the IDC indication message with the same content as in the previously sent IDC indication message if the UE has sent the IDC indication message to a source evolved NodeB (eNB) later than the same UE has sent a previous measurement report to the same source eNB.

In one embodiment, the method may comprise sending, in a target cell, the IDC indication message with a same comment as in the previously sent IDC indication message if the UE has sent the IDC indication message to a source eNB a maximum number of seconds before the UE has received a handover command. The maximum number of seconds may be a fixed time. Alternatively, the maximum number of seconds may be a configurable time. The maximum number of seconds may, for example, be 0.5, 0.75, 1, 1.25, 1.5, or 2 seconds.

It should be appreciated that the IDC indication message (which is sent with the same content as in a previously sent IDC indication message if the UE has performed a handover to another cell) may be sent to a target eNB.

According to a second aspect, there is provided a user equipment (UE). The UE comprises a controller with one or more data processors and one or more memories connected to the one or more data processors. The one or more memories store program and other information and data which, when, run in the one or more data processors causes the UE to send an In-Device Coexistence (IDC) indication message with a same content as in a previously sent IDC indication message if the UE has performed a handover to another cell.

In one embodiment, the one or more memories store program and other information and data which, when, run in the one or more data processors causes the UE to send, in a target cell, the IDC indication message with the same content as in the previously sent IDC indication message if the UE has sent the IDC indication message to a source evolved NodeB (eNB) later than a previous measurement report has been sent.

In one embodiment, the one or more memories store program and other information and data which, when, run in the one or more data processors causes the UE to send, in a target cell, the IDC indication message with a same comment as in the previously sent IDC indication message if the UE has sent the IDC indication message to a source eNB a maximum number of seconds before the UE has received a handover command. The maximum number of seconds may be a fixed time. Alternatively, the maximum number of seconds may be a configurable time. The maximum number of seconds may, for example, be 0.5, 0.75, 1, 1.25, 1.5, or 2 seconds.

In one embodiment, the one or more memories store program and other information and data which, when, run in the one or more data processors causes the UE to send the IDC indication message with the same content as in the previously sent IDC indication message to a target eNB.

According to a third aspect, there is provided a method performed by a user equipment (UE). The method comprises transmitting an In-Device Coexistence (IDC) indication message to a network after a time parameter or a frequency parameter changes.

In one embodiment, the method may comprise sending the IDC indication message to a base station (e.g. a eNB).

In one embodiment, the time parameter is a Time Division Multiplexing (TDM) parameter.

In one embodiment, the frequency parameter is a Frequency Division Multiplexing (FDM) parameter.

In one embodiment, the method may comprise resending the IDC indication message irrespective of an IDC indication prohibit timer. For example, the method may comprise resending the IDC indication message irrespective of an IDC indication prohibit timer if one or more time parameters (e.g. TDM parameters) have changed but not when frequency parameters (e.g. FDM parameters) have changed. Alternatively, the method may comprise resending the IDC indication message irrespective of an IDC indication prohibit timer if one or more frequency parameters (e.g. FDM parameters) have changed but not when time parameters (e.g. TDM parameters) have changed.

According to a fourth aspect, there is provided a user equipment (UE). This UE comprises a controller with one or more data processors and one or more memories connected to the one or more data processors; wherein the one or more memories store program and other information and data which, when, run in the one or more data processors causes the UE to transmit an In-Device Coexistence, IDC, indication message to a network (e.g. a base station) after a time parameter or a frequency parameter changes.

In one embodiment, the time parameter is a Time Division Multiplexing (TDM) parameter.

In one embodiment, the frequency parameter is a Frequency Division Multiplexing (FDM) parameter.

In one embodiment, the one or more memories may store program and other information and data which, when, run in the one or more data processors causes the UE to resend the IDC indication message irrespective of an IDC indication prohibit timer. For example, the one or more memories may store program and other information and data which, when, run in the one or more data processors causes the UE to resend the IDC indication message irrespective of an IDC indication prohibit timer if one or more time parameters (e.g. TDM parameters) have changed but not when frequency parameters (e.g. FDM parameters) have changed. Alternatively, the one or more memories may store program and other information and data which, when, run in the one or more data processors causes the UE to resend the IDC indication message irrespective of an IDC indication prohibit timer if one or more frequency parameters (e.g. FDM parameters) have changed but not when time parameters (e.g. TDM parameters) have changed.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The following sets forth specific details, such as particular embodiments for purposes of explanation and not limitation. It will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

It should be understood by the skilled in the art that "UE" is a non-limiting term comprising any wireless device or node equipped with a radio interface allowing for at least one of: transmitting signals in UL and receiving and/or measuring signals in DL. A UE herein may comprise a UE (in its general sense) capable of operating or at least performing measurements in one or more frequencies, carrier frequencies, component carriers or frequency bands. It may be a "UE" operating in single- or multi-RAT or multi-standard mode.

A cell is associated with a base station, where a base station comprises in a general sense any node transmitting radio signals in the downlink (DL) and/or receiving radio signals in the uplink (UL). Some example base stations are eNodeB, eNB, Node B, macro/micro/pico radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

The signaling described is either via direct links or logical links (e.g. via higher layer protocols and/or via one or more network nodes). For example, signaling from a coordinating node may pass another network node, e.g., a radio node.

The example embodiments are described in the non-limiting example context of an E-UTRAN type system. However, the technology is not limited thereto, and may apply to any Radio Access Network (RAN), single-RAT or multi-RAT.

In one non-limiting embodiment, a UE may transmit an IDC indication message to the network, e.g., a base station, after a time parameter, e.g., a TDM parameter, or a frequency parameter, e.g., an FDM parameter, changes. In this way, the UE avoids IDC indication signaling in situations where the UE would simply send the same or a slightly modified IDC indication which would not require responsive action from the network. On the other hand, when IDC information changes, it is important for the network to receive this information as soon as practical.

If FDM parameters, e.g., carrier frequencies suffering from IDC interference, are not expected to change frequently, the UE likely does not need to send another IDC indication soon after it sent the previous IDC indication. Some non-optimized UE implementations may change boundary frequencies suffering from the interference continuously to bypass the IDC indication prohibit timer, but this creates an undesirable and typically unnecessary signaling load. Thus, in one example embodiment, the UE may resend the IDC indication irrespective of the IDC indication prohibit timer if one or more time base parameters, e.g., TDM parameters, have changed but not when FDM parameters have changed. Here, it is assumed that the UE does not unnecessarily change the time-based parameters.

In some other scenarios, frequency-based parameters may be expected to change relatively often whereas time-based parameters do not. This can occur for example when an interfering radio uses adaptive frequency hopping or frequently changes its frequency. In such a case, time-based parameters are likely to remain substantially the same over a longer period. Accordingly, the UE may resend the IDC indication to the network irrespective of the IDC indication prohibit timer if frequency-based, e.g., FDM, parameters have changed but not when time-based, e.g., TDM, parameters have changed.

The network may configure in which scenario the UE is allowed to send an updated IDC indication message, e.g., only in the case when TDM parameters have changed or only when FDM parameters have changed. Furthermore, if the UE changes parameters too often, then the network can release or override the IDC configuration to control the IDC indication signaling load.

Another non-limiting example embodiment sends an IDC indication after handover (HO), i.e., the UE sends an IDC indication after handover (HO). It may be assumed for this example that the UE is not allowed to send an IDC indication having a same content as the previous one irrespective of the prohibit timer. Or said differently, for this example it may be assumed that UEs, in the prior art, are generally not allowed to send an IDC indication having a same content as the previous one irrespective of the prohibit timer. However, it should also be appreciated that the embodiments described hereinbelow do not necessarily involve the use of a prohibit timer. In other words, these embodiments can be reduced to practice also without the use of a prohibit timer.

When the UE performs handover to a new eNB, it is desirable for the IDC assistance information to be transferred from the source eNB to the target eB over the X2 interface. But this is not always possible.

Consider, for example, a scenario where the UE first sends a measurement report to the network. Based on the measurement report, the source eNB starts handover preparation with the target eNB. During this preparation, parameters related to the UE context are transferred from the source node to the target node, which can take some time. After the target eNB has confirmed handover, the source eNB sends a handover command to the UE. During the time between the measurement report and the handover command, the UE may send (see e.g. step 303 in FIG. 3) an IDC indication to the source eNB. However, because handover preparation (see e.g. step 302 in FIG. 3) started already, parameters in the just sent IDC indication are not necessarily transferred to the target eNB.

Figure 2:
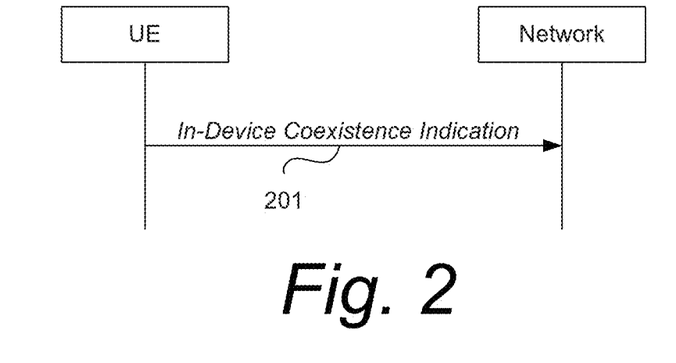
FIG. 2 shows a simplified signaling diagram illustrating an example embodiment where a UE is allowed to send an IDC indication with the same content as in the previous IDC indication message if it has performed handover to another cell.

In one example embodiment, which is also schematically illustrated in FIG. 2, this problem is solved by allowing the UE to send 201 the IDC indication with the same content as in the previous IDC indication message if it has performed HO to another cell.

Figure 3:
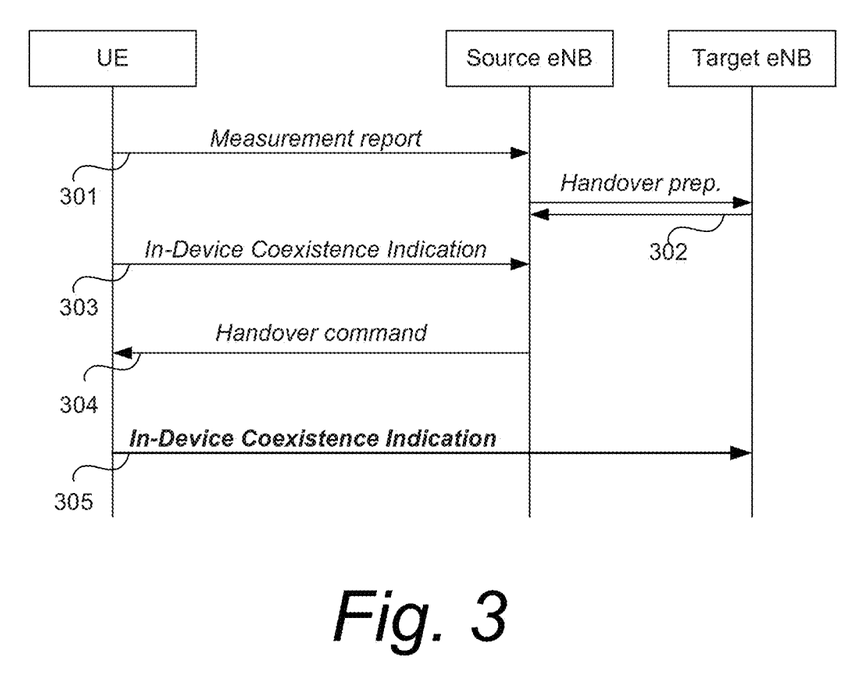
FIG. 3 shows a signaling diagram illustrating an example embodiment where a UE sends an IDC indication with the same content as in a previous message in a target cell (e.g. target eNB) if it has sent the previous IDC indication to the source eNB later than a previous measurement report was sent to the source eNB.

In another example embodiment, which is illustrated in FIG. 3, the UE sends 305 an IDC indication with the same content as in the previous message in the target cell if it has sent 303 the IDC indication to the source eNB later than the previous measurement report has been sent 301.

In a variation of previous example embodiments, the UE may send 305 an IDC indication with the same content as in the previous IDC indication message in the target cell if the UE has sent 303 the IDC indication to the source eNB a maximum of X seconds before it has received 304 the handover command. Time X can be a fixed time or a configurable time, e.g., by the network. The time X may for example be 1 second. Alternatively, the time X may take other values such as 0.5, 075, 1.25, 1.5 or 2 seconds.

As will be appreciated, IDC indication messages may be transferred to the network when appropriate and needed but at the same time efficiently so that unnecessary signaling is avoided thereby saving radio resources and processing resources. Also, the embodiments shown in FIGS. 2 and 3, respectively, may allow for ensuring that a target eNB receives correct IDC information. If the UE would not resend the IDC indication message as proposed, there would be a potential risk that the target eNB has incorrect information, because as described earlier handover preparation started already and parameters in a previously sent IDC indication may not necessarily have been transferred from the source eNB to the target eNB. In such scenario, the UE would thus risk continuing to experience IDC interference, since the target eNB has the incorrect information.

Figure 4:
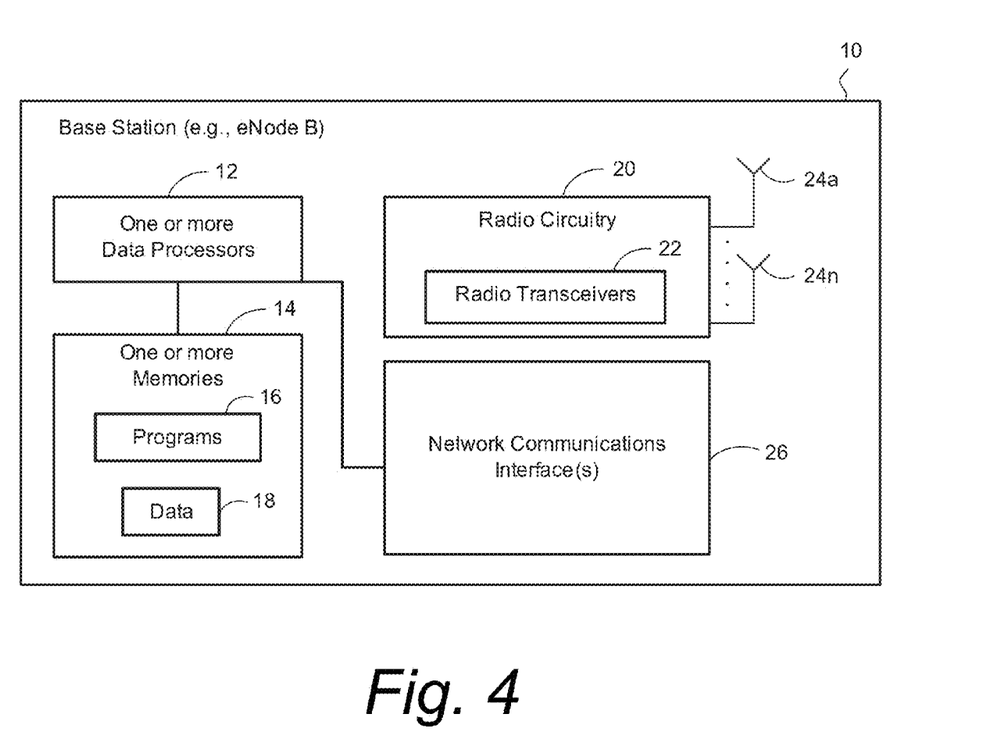
FIG. 4 shows an example embodiment of a base station, e.g. an eNB.

A function block diagram is provided in FIG. 4 which shows a base station, e.g., an eNB, that can be used in example embodiments described above. The base station comprises one or more data processors 12 that control the operation of the base station. The one or more data processors 12 are connected to radio circuitry 20 that includes multiple radio transceivers 22 with associated antenna(s) 24a . . . 24n which are used to transmit signals to, and receive signals from, other radio nodes such as user equipments (UEs). The base station also comprises one or more memories 14 connected to the one or more data processors 12 and that store program 16 and other information and data 18 required for the operation of the base station and to implement the functions described above. The base station also includes components and/or circuitry 26 for allowing the base station to exchange information with other base stations and/or other network nodes.

Figure 5:
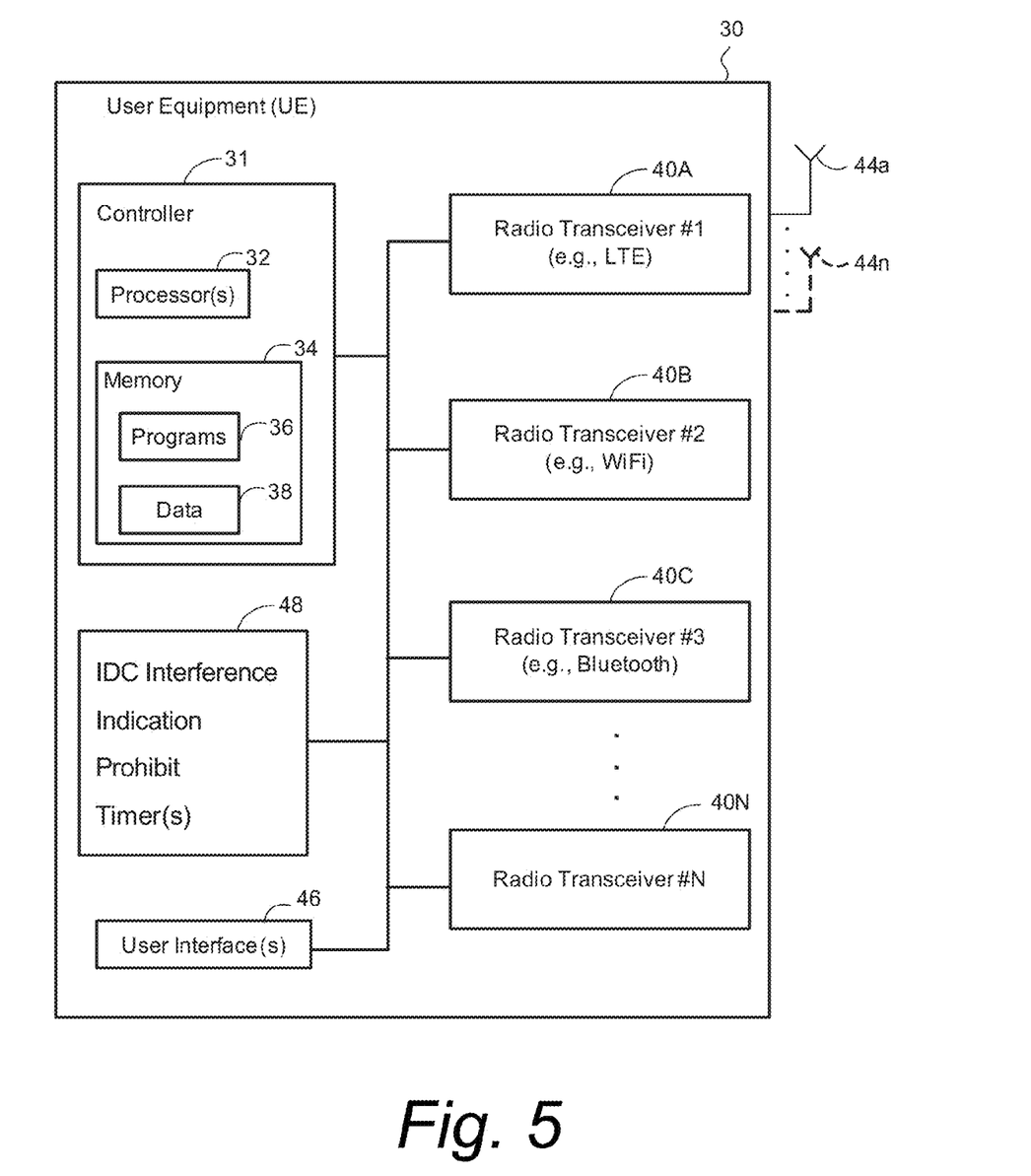
FIG. 5 shows an example embodiment of a user equipment.

A function block diagram is provided in FIG. 5 which shows a UE 30 that can be used in example embodiments described above. The UE 30 comprises a controller 31 with one or more data processors 32 that control the operation of the UE 30. The one or more data processors 32 are connected to multiple radio transceivers 40A, 40B, 40C, . . . , 40N that may be selectively coupled with one or more antenna(s) 44a . . . 44n which are used to transmit signals to, and receive signals from, other radio nodes such as base stations. The UE controller 31 also comprises one or more memories 34 connected to the one or more data processors 32 and that store program 36 and other information and data 38 required for the operation of the UE 30 and to implement the UE functions described above. The UE 30 also includes IDC interference indication prohibit timer(s) 48 used by the controller 31 along with other factors to determine when an IDC indication message may be transmitted. One or more user interfaces 46 is further provided to allow a user to retrieve, receive, store, and send information.

More particularly, the user equipment UE 30 comprises a controller 31 with one or more data processors 32 and one or more memories 34 connected to the one or more data processors 32; wherein the one or more memories 34 store program 36 and other information and data 38 which, when, run in the one or more data processors 32 causes the UE 30 to send an IDC indication message with a same content as in a previously sent IDC indication message if the UE has performed a handover to another cell. The one or more memories 34 may store program 36 and other information and data 38 which, when, run in the one or more data processors 32 causes the UE 30 to send the IDC indication message with the same content as in the previously sent IDC indication message in a target cell if the UE has sent the IDC indication message to a source evolved NodeB (eNB) later than a previous measurement report has been sent. Furthermore, the one or more memories 34 may store program 36 and other information and data 38 which, when, run in the one or more data processors 32 causes the UE 30 to send the IDC indication message with a same comment as in the previously sent IDC indication message in a target cell if the UE has sent the IDC indication message to a source eNB a maximum number of seconds before the UE has received a handover command. Again, the maximum number of seconds may be a fixed time. Alternatively, the maximum number of seconds may be a configurable time. The time may, for example, be 0.5, 075, 1, 1.25, 1.5 or 2 seconds.

Yet further, the one or more memories 34 may store program 36 and other information and data 38 which, when, run in the one or more data processors 32 causes the UE 30 to transmit an IDC indication message to a network (e.g. a base station) after a time parameter (e.g. a TDM parameter) or a frequency parameter (e.g. a FDM parameter) changes.

Furthermore, the one or more memories 34 may store program 36 and other information and data 38 which, when, run in the one or more data processors 32 causes the UE 30 to resend the IDC indication message irrespective of an IDC indication prohibit timer 48. For example, the one or more memories 34 may store program 36 and other information and data 38 which, when, run in the one or more data processors 32 causes the UE 30 to resend the IDC indication message irrespective of an IDC indication prohibit timer if one or more time parameters (e.g. TDM parameters) have changed but not when frequency parameters (e.g. FDM parameters) have changed. Alternatively, the one or more memories 34 may store program 36 and other information and data 38 which, when, run in the one or more data processors 32 causes the UE 30 to resend the IDC indication message irrespective of an IDC indication prohibit timer if one or more frequency parameters (e.g. FDM parameters) have changed but not when time parameters (e.g. TDM parameters) have changed.

The technology described throughout this disclosure includes many advantages. For example, IDC indication messages may be transferred to the network when appropriate and needed but at the same time efficiently so that unnecessary signaling is avoided thereby saving radio resources and processing resources. Some of the embodiments may also allow for ensuring that a target eNB receives correct IDC information.

Although the description above contains many specifics, they should not be construed as limiting but as merely providing illustrations of some presently preferred embodiments. Embodiments described herein may be considered as independent embodiments or may be considered in any combination with each other to describe non-limiting examples. Although non-limiting, example embodiments of the technology were described in a EUTRAN context, the principles of the technology described may also be applied to other radio access technologies, such as e.g. UTRAN. Indeed, the technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method performed by a user equipment, UE, the method comprising:
sending, in a target cell, an In-Device Coexistence, IDC, indication message with a same content as in a previously sent IDC indication message if the UE has performed a handover from a source cell to the target cell and the UE has sent the IDC indication message to the source cell later than a previous measurement report has been sent.

2. The method according to claim 1, wherein the IDC indication message is sent to a target eNB.

3. The method according to claim 1, wherein the source cell is a source eNB.

4. A method performed by a user equipment, UE, the method comprising:
sending, in a target cell, an In-Device Coexistence, IDC, indication message with a same content as in a previously sent IDC indication message if the UE has performed a handover from a source cell to the target cell and the UE has sent the IDC indication message to the source cell a maximum number of seconds before the UE has received a handover command.

5. The method according to claim 4, wherein the maximum number of seconds is a fixed time.

6. The method according to claim 4, wherein the maximum number of seconds is a configurable time.

7. The method according to claim 4, wherein the source cell is a source eNB.

8. The method according to claim 4, wherein the IDC indication message is sent to a target eNB.

9. A user equipment, UE, comprising a controller with one or more data processors and one or more memories connected to the one or more data processors; wherein the one or more memories store program and other information and data which, when, run in the one or more data processors causes the UE to send, in a target cell, an In-Device Coexistence, IDC, indication message with a same content as in a previously sent IDC indication message if the UE has performed a handover from a source cell to the target cell and the UE has sent the IDC indication message to the source cell later than a previous measurement report has been sent.

10. The UE according to claim 9, wherein the one or more memories store program and other information and data which, when, run in the one or more data processors causes the UE to send the IDC indication message to a target eNB.

11. The UE according to claim 9, wherein the source cell is a source eNB.

12. A user equipment, UE, comprising a controller with one or more data processors and one or more memories connected to the one or more data processors; wherein the one or more memories store program and other information and data which, when, run in the one or more data processors causes the UE to send, in a target cell, an In-Device Coexistence, IDC, indication message with a same content as in a previously sent IDC indication message if the UE has performed a handover from a source cell to the target cell and the UE has sent the IDC indication message to the source cell a maximum number of seconds before the UE has received a handover command.

13. The UE according to claim 12, wherein the maximum number of seconds is a fixed time.

14. The UE according to claim 12, wherein the maximum number of seconds is a configurable time.

15. The UE according to claim 12, wherein the source cell is a source eNB.

16. The UE according to claim 12, wherein the one or more memories store program and other information and data which, when, run in the one or more data processors causes the UE to send the IDC indication message to a target eNB.

* * * * *